US005475776A

United States Patent [19]
Jenkins et al.

[11] Patent Number: 5,475,776
[45] Date of Patent: Dec. 12, 1995

[54] OPTICAL MIXING DEVICE

[75] Inventors: Richard M. Jenkins; John M. Heaton; Robert W. Devereux, all of Worcester, United Kingdom

[73] Assignee: The Secretary of State for Defence in Her Britannic Majesty's Government of the United Kingdom of Great Britain and Northern Ireland, London, England

[21] Appl. No.: 64,017

[22] PCT Filed: Dec. 2, 1991

[86] PCT No.: PCT/GB91/02133

§ 371 Date: May 19, 1993

§ 102(e) Date: May 19, 1993

[87] PCT Pub. No.: WO92/11562

PCT Pub. Date: Jul. 9, 1992

[30] Foreign Application Priority Data

Dec. 20, 1990 [GB] United Kingdom ................ 9027659

[51] Int. Cl.$^6$ .................................... G02B 6/26
[52] U.S. Cl. ............................. 385/28; 385/146
[58] Field of Search ..................... 385/28, 27, 33, 385/34, 45, 46, 48, 49, 14, 88, 89, 90, 91, 92, 93, 94, 125, 132, 146

[56] References Cited

U.S. PATENT DOCUMENTS 3,563,630  2/1971  Anderson et al. ............... 385/132
3,750,183  7/1973  Drabowitch ...................... 363/786

(List continued on next page.)

FOREIGN PATENT DOCUMENTS 0330457  8/1989  European Pat. Off. .

(List continued on next page.)

OTHER PUBLICATIONS

Niemeier et al., "Quadrature outputs from fiber interferometer with 4×4 coupler," Optics Letters, Oct. 1986/vol. 11, No. 10.
Croston et al., "A Highly Dispersive Wavelength . . . Operation", IEEE Photonics Letters, vol. 2, No. 10, Oct. 1990.
S. W. Drabowitch, "Multimode Antennas" Jan. 1966.
Bryngdahl; Journal of the Optical Society of America, vol. 63, No. 4, Jun. 1973; pp. 416–419.

(List continued on next page.)

Primary Examiner—Rodney B. Bovernick
Assistant Examiner—J. Ngo
Attorney, Agent, or Firm—Nixon & Vanderhye

[57] ABSTRACT

An optical mixing device (10) incorporates a rectangular multimode waveguide (14), with an input region (22) and an output region (24), two square section input waveguides (26, 28), and a detector (34). The input waveguides (26, 28) are arranged to provide first and second input radiation beams respectively to the input region (22), each beam being in the form of a square waveguide fundamental mode beam. Modal dispersion along the multimode waveguide (14) produces a single maximum incident on the detector (34) when the input beams are in phase with one another, and two maxima of like magnitude located on opposite sides of the detector (34) when the input beams are in antiphase. Intermediate these two situations three maxima are produced, the amplitudes depending on phase difference. The first and second input beams may be of like frequency producing a time-independent device output. The input beams may alternatively have different frequencies. For instance the first input beam may be a local oscillator signal produced by a coherent source of stable frequency, and the second input beam may be a Doppler shifted version of an output signal from that source. The device output then provides an intermediate frequency signal. The intensity incident on the detector (34) thus varies at the difference frequency of the two inputs. Similar devices may be constructed with additional inputs and with different forms of output.

15 Claims, 8 Drawing Sheets

U.S. PATENT DOCUMENTS

| | | | |
|---|---|---|---|
| 3,832,029 | 8/1974 | Bryngdahl | 385/133 |
| 4,087,159 | 5/1978 | Ulrich | 385/129 |
| 4,150,870 | 4/1979 | d'Auria | 385/115 |
| 4,212,512 | 7/1980 | Hodge | 385/46 |
| 4,652,290 | 3/1987 | Cho et al. | 385/132 |
| 4,747,655 | 5/1988 | Shirasaki | 385/37 |
| 4,800,557 | 1/1989 | Weber | 385/37 |
| 4,950,045 | 8/1990 | Bricheno et al. | 385/49 |
| 4,975,237 | 12/1990 | Brown | 385/8 |
| 5,113,244 | 5/1992 | Curran | 385/34 |
| 5,239,598 | 8/1993 | Wight et al. | 356/338 |
| 5,271,079 | 12/1993 | Levinson | 385/46 |

FOREIGN PATENT DOCUMENTS

| | | | |
|---|---|---|---|
| 0330539 | 8/1989 | European Pat. Off. | |
| 0395060 | 10/1990 | European Pat. Off. | |
| 2634288 | 1/1990 | France. | |
| 59-135417 | 8/1984 | Japan | 385/46 |
| 59-152417 | 8/1984 | Japan | 385/46 |
| 59-195618 | 11/1984 | Japan | 385/46 |
| 62-36611 | 2/1987 | Japan | 385/46 |
| 1-190037 | 7/1989 | Japan | 385/46 |
| 1525492 | 9/1978 | United Kingdom. | |
| 2207525 | 2/1989 | United Kingdom. | |

OTHER PUBLICATIONS

Fielding et al.; European Conference on Optical Communications, 1989; pp. 17–21 no month.

Ikegami et al.; *Physics World*, 91/91; "Passive Paths for Networks" pp. 50–54 no month.

Jansen et al.; *Applied Physics Letter* 55 (19), Nov. 1989; "Diffraction–limited Operation from monolithically integrated diode laser array and self–imaging (Talbot) cavity"; pp. 1949–1551.

Simon et al.; Applied Physics Letters, vol. 31, No. 2, Jul. 1977; "Fiber–optical interferometer"; pp. 77–79.

OPTICAL MIXING DEVICE

BACKGROUND OF THE INVENTION

1. Field of the Invention

This invention relates to an optical mixing device.

DISCUSSION OF PRIOR ART

Optical devices for beam mixing are well known in the prior art. Beamsplitters are employed to mix two optical beams as described by A F Harvey in "Coherent Light" p1046, Wiley, London (1970). They may be used in free space or incorporated into waveguide systems.

Optical Y-junctions of various forms are known in the prior art for the production of mixed beams. Various passive symmetrical Y-junctions are discussed by Z. Weissman, A. Hardy and E. Marom in "Mode-Dependent Radiation Loss in Y-Junctions and Directional Couplers", IEEE Journal of Quantum Electronics Vol. 25, No. 6 (1989) pp. 1200–1208. Asymmetric Y-junctions are discussed by K. Shirafuji and S. Kurazono in "Transmission Characteristics of Optical Asymmetric Y Junction with a Gap Region", Journal of Lightwave Technology Vol 9, No 4 (1991) pp. 426–429. Active Y-junctions are also known, and examples are described by H. Sasaki and I. Anderson in "Theoretical and Experimental Studies on Active Y-junctions in Optical Waveguides", IEEE Journal of Quantum Electronics Vol. QE-14, No. 11 (1978) pp. 883–892. Each of these references discusses in detail the use of Y-junctions for beam splitting, but gives little detail on their use for beam combination or mixing. Indeed the symmetric Y-junctions, both active and passive, are inefficient splitters. Their transmission is heavily dependent on the angle of splitting; transmission is as low as 20% for splitting of a few degrees.

Prior art arrangements for mixing of more than two beams involve beamsplitter or Y-junction devices used in series. The losses of individual devices are therefore multiplied leading to very inefficient beam mixing.

If subsequent detection is required then the mixed beam, or beams, may be directed to appropriate detectors. However, in addition to their inefficiency, prior art mixing devices based on Y-junctions also suffer from the disadvantage of only having one output port. This redu the available information concerning the relative phases of the input beams. Therefore such prior art devices are of limited usefulness for applications such as heterodyne detection where comprehensive phase information is important.

SUMMARY OF THE INVENTION

It is an object of the invention to provide an alternative form of optical mixing device.

The present invention provides an optical mixing device for operation at a wavelength $\gamma$ and including:

(a) a waveguide having an input region and an output region, and (b) radiation supplying means arranged to provide two input radiation beams directed to the input region, characterised in that (A) the waveguide is a multimode waveguide, (B) detecting means are arranged to receive radiation transmitted by the waveguide to the output region, and (C) the dimensions of the waveguide, and the positions and spatial characteristics of the input radiation beams are in combination arranged to provide for modal dispersion in the waveguide giving rise to input radiation mixing in the output region and mixed radiation detection by the detecting means.

The present invention provides the advantage that two input beams may be efficiently mixed. Theoretically the invention might provide mixing with 100% efficiency. In practice, efficiencies of 75% have been achieved in non-optimised embodiments of the invention. The invention provides the additional advantage that phase information contained in input radiation beams is not lost when the beams are mixed. This enables mixing to be carried out prior to detection. The waveguide incorporated in devices of the invention may be of rectangular cross-section, of height $2a$ and width $2b$, where b is greater than a. The detecting means may be located centrally in the output region. Additional detecting means may be included. These may be two additional detecting means located within the output region distant b/2 to either side laterally of the centre of the output region, where b is as defined earlier. In such a device the waveguide may be of length $L=2b^2/\gamma$, where $\gamma$ is the wavelength of input radiation measured within the waveguide.

Mixing devices of the invention may incorporate first and second detecting means. Each of these detecting means may be located within the output region and distant b/2 laterally from and on a respective side of the output region centre. The waveguide may be of length L equal to either $4b^2/\gamma$ or $8b^2/\gamma$.

Mixing devices of the invention may be constructed with additional input radiation beams.

The waveguide may be formed as a hollow within solid dielectric material. The dielectric material may be alumina. Alternatively the waveguide may be formed as a ridge waveguide upstanding from a substrate. It may be formed of layers of a ternary or quaternary semiconductor material system such as $Al_xGa_{1-x}As$.

The two or more input radiation beams may be supplied by square cross section input waveguides arranged for operation in fundamental mode. This provides spatial characteristics of the radiation electric field in the form of a half-cycle of a sine wave.

A mixing device of the invention arranged as a heterodyne mixer may be incorporated in an optical system which includes a coherent radiation source arranged to generate an output beam and a local oscillator beam signal, and means for collecting radiation reflected or scattered from a test region. Such a mixing device is arranged to mix the local oscillator beam and the collected radiation.

BRIEF DISCUSSION OF THE DRAWINGS

In order that the invention may be more fully understood, embodiments thereof will now be described, by way of example only, with reference to the accompanying drawings, in which.

DETAILED DISCUSSION OF PREFERRED EMBODIMENTS

Figure 1:
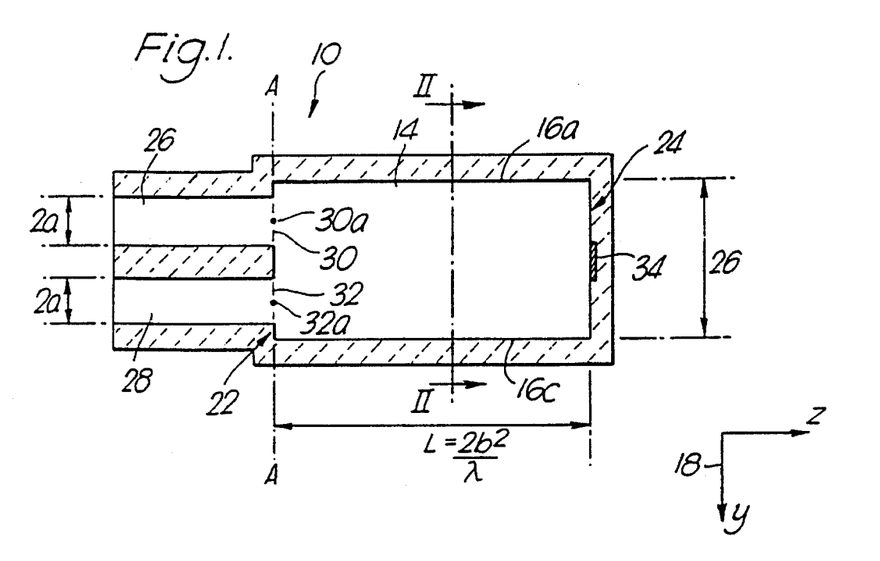
FIG. 1 is a schematic sectional plan view of an optical device of the invention in the form of a mixer for use in heterodyne detection.
Figure 2:
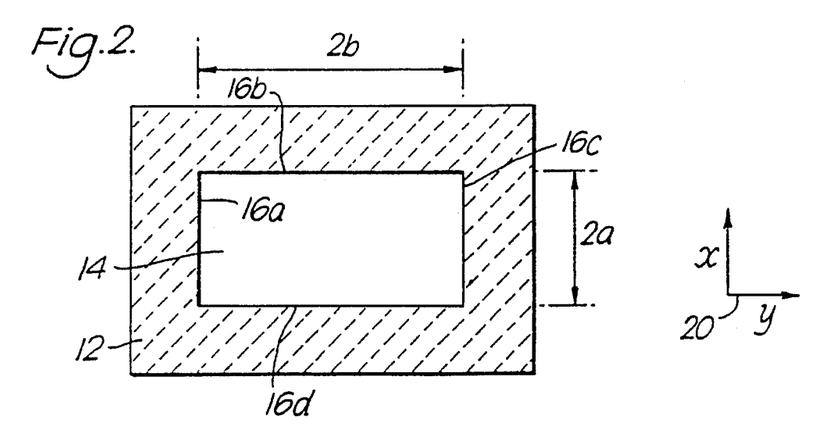
FIG. 2 is a sectional view on line II—II in FIG. 1 looking in the direction of the arrows.

Referring to FIGS. 1 and 2, there are shown sectional views of an optical device of the invention in the form of a mixer indicated generally by 10. The mixer 10 incorporates a rectangular block 12 with a rectangular cross-section hole running through it to define a rectangular waveguide 14. The waveguide 14 has constant rectangular cross-section and reflecting walls 16a to 16d; it is of height 2a, width 2b and length L, these dimensions being respectively parallel to x, y and z Cartesian coordinate axes indicated by 18 and 20. Of these, x is referred to as vertical (perpendicular to the plane of FIG. 1) and y and z as horizontal (in the plane of FIG. 1), for ease of expression. The origin of the co-ordinate system is defined, for the purpose of this specification, to be such that dashed line A—A in FIG. 1 indicates the plane z=0, and walls 16a to 16d lie in planes y=−b, x=+a, y=+b and x=−a respectively. The waveguide 14 has an input region 22 in the plane z= 0, and an output region 24 in the plane z= L.

The parameters a, b and L are employed to preserve generality, specific values will be described later. However, in this example b>2a.

The mixer 10 also incorporates two square cross-section input waveguides 26 and 28. The input waveguides 26, 28 have output apertures 30 and 32 arranged in the input region 22 of waveguide 14 such that their centres 30a and 32a are located at x=0, y= −b/2, z= 0 and x=0, y=+b/2, z= 0 respectively. A detector 34 is arranged in the output region 24 of the waveguide 14 such that its centre is located at x= 0, y= 0, z=L.

The waveguides 14, 26 and 28 are formed of alumina. The detector 34 is a mercury cadmium telluride detector with associated circuitry of known kind.

The operation of the mixer 10 will now be described in general terms; a more detailed theoretical analysis will be given later. The input waveguides 26 and 28 receive input radiation from a coherent source (not shown), and each carries a fundamental $EH_{11}$ mode radiation beam. These radiation beams in the input waveguides 26 and 28 provide two fundamental $EH_{11}$ mode inputs to the rectangular waveguide 14, in which a number of $EH_{mn}$ modes are excited in consequence. These modes interact with each other as described in detail later. The effects produced by the interaction depend on the relative frequencies and phases of the input beams. Two input beams which are of like frequency and which are in phase with one another produce a single central maximum which is centred at the point x= 0, y= 0, z= L and which is incident on the detector 34. However, when two input beams of like frequency are in antiphase, the input field is regenerated with two maxima incident on respective sides of the detector 34.

If however the two input radiation beams differ slightly in wavelength, for example by virtue of a relative Doppler shift, the electric field at the output region 24 varies between a single central maximum and two laterally positioned maxima. This variation occurs at the beat frequency of the two input radiation beams. The intensity of light incident on the detector 34 therefore varies at the beat frequency. The device 10 may therefore be used as a heterodyne mixer. For example, one of the input waveguides 28 may carry a received signal obtained from a target zone by reflection or scattering of radiation an output from a coherent source; the other input waveguide 26 may then carry a local oscillator signal obtained from a like source and employed in the device 10 for mixing with the received signal. Any beat frequency obtained by this mixing indicates Doppler frequency shift produced in the target zone from motion of reflectors and/or scatterers of the source radiation.

The effects of mode interaction within the device 10 are the result of a specific example of a more general phenomenon. They arise from the form of excitation of the rectangular waveguide 14 and the relationship between the waveguide length L, waveguide width 2b and radiation wavelength γ. In the device 10 the length L is given by $$L = \frac{2b^2}{\lambda} \tag{1}$$

where γ is the wavelength of the local oscillator radiation in the rectangular waveguide 14. The wavelength of a Doppler shifted received signal varies with time. As will be described later, changes in the waveguide length L and in the location and form of the input to it alter the form of the electric field at the output region.

The theoretical propagation characteristics of a rectangular waveguide will now be analysed. It is assumed that the waveguide has height 2a, width 2b and is bounded by a homogeneous dielectric material with complex dielectric constant ε. It is also assumed that this dielectric material (which provides the waveguide walls) is highly reflecting and not significantly attenuating for required propagating modes. The waveguide has height, width and length dimensions which are parallel to the x, y and z axes respectively. It has normalised linearly polarized modes of the kind $EH_{mn}$. The electric field contribution $E_{mn}(x,y,z)$ of the $mn^{th}$ mode $EH_{mn}$ at the point (x,y,z) has been calculated by Laakmann et al in Appl. Opt. Vol. 15, No. 5, pages 1334–1322, May 1976 as follows:

$$E_{mn}(x,y,z) = \frac{1}{\sqrt{(ab)}} \left[ \begin{array}{c} \cos \\ \sin \end{array} \left( \frac{m\pi x}{2a} \right) \right] \left[ \begin{array}{c} \cos \\ \sin \end{array} \left( \frac{n\pi y}{2b} \right) \right] e^{i\gamma_{mn}z} \tag{2}$$

where m is the mode number relating to the field dependency along the x axis, n is the mode number relating to the field dependency along the y axis, z is the distance along the z axis, $\Upsilon_{mn}=(\beta_{mn}+i\alpha_{mn})$, the propagation constant of the $mn^{th}$ mode, $\beta_{mn}$ and $\alpha_{mn}$ being the $mn^{th}$ mode's phase and attenuation coefficients, and "cos" above "sin" indicates the former applies to odd mode numbers (m or n as appropriate) and the latter to even mode numbers.

The phase coefficient $\beta_{mn}$ is given by:

$$\beta_{mn} = \frac{2\pi}{\lambda} \left[ 1 - \left\{ \left(\frac{\lambda m}{4a}\right)^2 + \left(\frac{\lambda n}{4b}\right)^2 \right\} \right]^{\frac{1}{2}} \quad (3.1)$$

If the negative term in parenthesis in Equation (3.1) is small compared with unity (paraxial radiation approximation), which is satisfied in practice, then the binomial theorem may be used to rewrite Equation (3.1) as:

$$\beta_{mn} = \frac{2\pi}{\lambda} \left[ 1 - \frac{1}{2} \left\{ \left(\frac{\lambda m}{4a}\right)^2 + \left(\frac{\lambda n}{4b}\right)^2 \right\} \right] \quad (3.2)$$

where a, b, m and n are as previously defined, and $\gamma$ is the wavelength of the radiation propagating in the waveguide.

Equation (2) sets out the electric field contributions obtainable from all linearly polarized modes of a rectangular waveguide. It is calculated on the basis that the electric field contribution of each mode is zero at the side walls 16a and 16c of the waveguide, i.e. at y=+b and −b. This is satisfied if the waveguide 14 has reflecting side walls 16.

The first situation to be considered is that of a rectangular waveguide of side 2a by 2b excited by radiation propagating as a single fundamental $EH_{11}^S$ mode from a square section waveguide of side 2a connected to one end of the rectangular waveguide and arranged coaxially therewith. The single $EH_{11}^S$ mode is coupled to the various $EH_{mn}$ modes of the rectangular waveguide. That is it becomes decomposed into a linear combination of the $EH_{mn}$ modes with respective complex multiplicative amplitude coupling coefficients $A_{mn}$. For the case of excitation of the rectangular waveguide modes $EH_{mn}$ by a square waveguide fundamental mode $EH_{11}^S$ the coefficients $A_{mn}$ are given by:

$$EH_{11}^S = \Sigma A_{mn} \cdot EH_{mn} \quad (4)$$

Essentially the $A_{mn}$ amplitude coupling coefficients are the coefficients of a Fourier series which represents the field at the input region. The $EH_{mn}$ modes are mutually orthogonal, and in consequence the coefficients $A_{mn}$ can be calculated from overlap integrals of the form:

$$A_{mn} = \int_{-b}^{+b} \int_{-a}^{+a} EH_{11}^S \times EH_{mn} \times dy \times dx. \quad (5)$$

Figure 3:
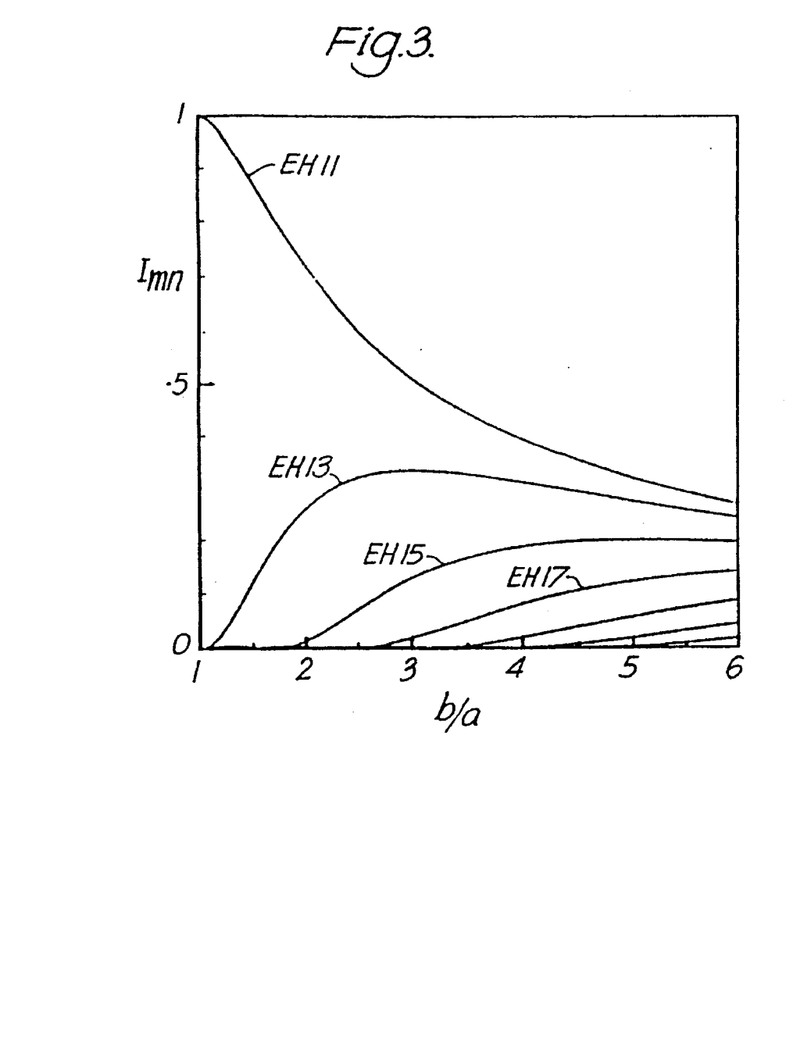
FIG. 3 graphically illustrates the variation of intensity coupling coefficients for rectangular waveguide $EH_{mn}$ modes with variation in the aspect ratio of the waveguide.

From Equations (2) to (5) it is possible to calculate how the intensity coefficients $I_{mn} = |A_{mn}|^2$ of the excited rectangular waveguide modes vary as a function of b/a, the ratio of the widths of the rectangular and square waveguides. FIG. 3 illustrates the variation of $I_{mn}$ with b/a; i.e. the effect of varying the waveguide aspect, or width to height, ratio. FIG. 3 indicates that $I_{mn} = 0$ except when m= 1 and n is odd. This is because of the symmetric nature of the excitation conditions. Consequently, the modes excited are only the symmetric modes $EH_{11}$, $EH_{13}$, $EH_{15}$ etc.

Figure 4:
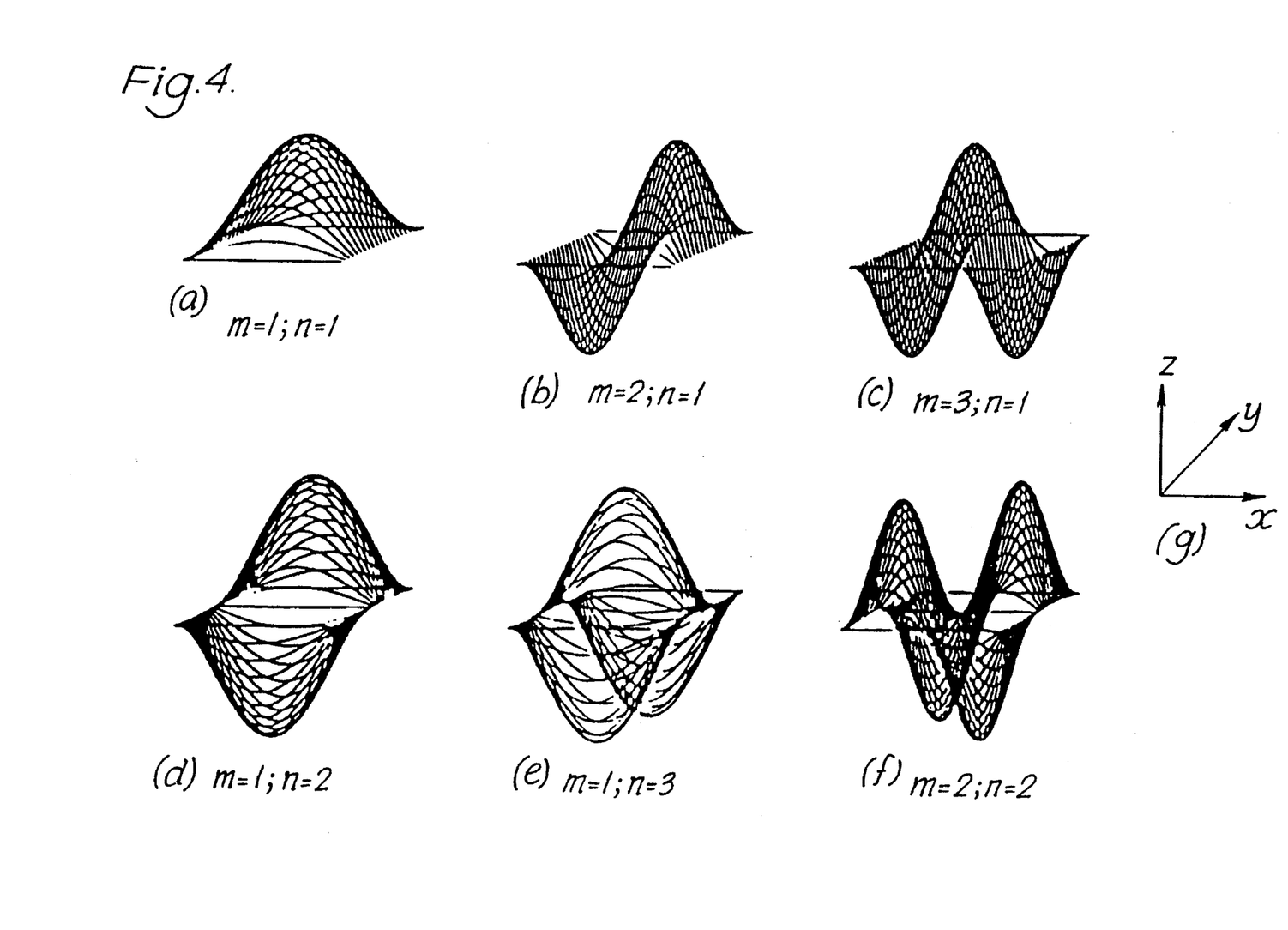
FIG. 4 shows field amplitude distributions for various lower order rectangular waveguide modes.

The forms of some of the lower order $EH_{mn}$ waveguide modes are shown as electric field amplitude distributions in FIG. 4. These were obtained by computation, and are shown as graphs (a) to (f) in quasi-three dimensional form. The coordinate axes are shown at (g). The axes x, y and z correspond to transverse vertical, transverse horizontal and longitudinal directions in the multimode waveguide as before. The graphs (a) to (f) correspond to modes as follows:

(a): $EH_{11}$; (b): $EH_{21}$; (c): $EH_{31}$;

(d): $EH_{12}$; (e): $EH_{13}$; (f): $EH_{22}$.

Of these, (a), (c) and (e) are symmetric modes and (b), (d) and (f) are antisymmetric modes. To clarify this, let E(x) and E(−x) respectively be the electrical field amplitude distributions associated respectively with positive and negative parts of the x axis in FIG. 1; E(x=0) is on the z axis. Let E(y) and E(−y) be the equivalents for the y axis.

For a symmetric mode:

$$E(x)=E(-x) \text{ and } E(y)=E(-y) \quad (6.1)$$

For an antisymmetric mode, either one of or both of (6.2) and (6.3) below apply:

$$E(x)=-E(-x) \quad (6.2)$$

$$E(y)=-E(-y) \quad (6.3)$$

In the initial situation considered the symmetric input provides for only symmetric modes of the multimode rectangular waveguide to be excited.

The transverse electric field distribution in an xy plane distant z from the input region is $E_z$ given by:

$$E_z = \Sigma A_{mn} \cdot EH_{mn} \quad (7)$$

Figure 5:
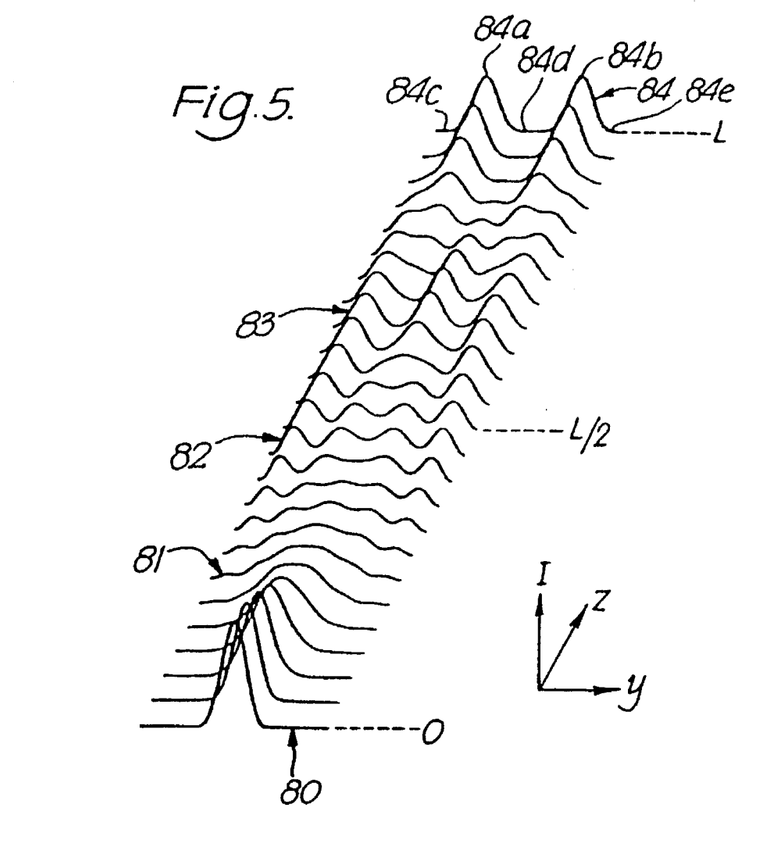
FIGS. 5 and 6 illustrate variation in electric field intensity distribution as a function of position along multimode waveguides with aspect ratios of 3 and 6 respectively.
Figure 6:
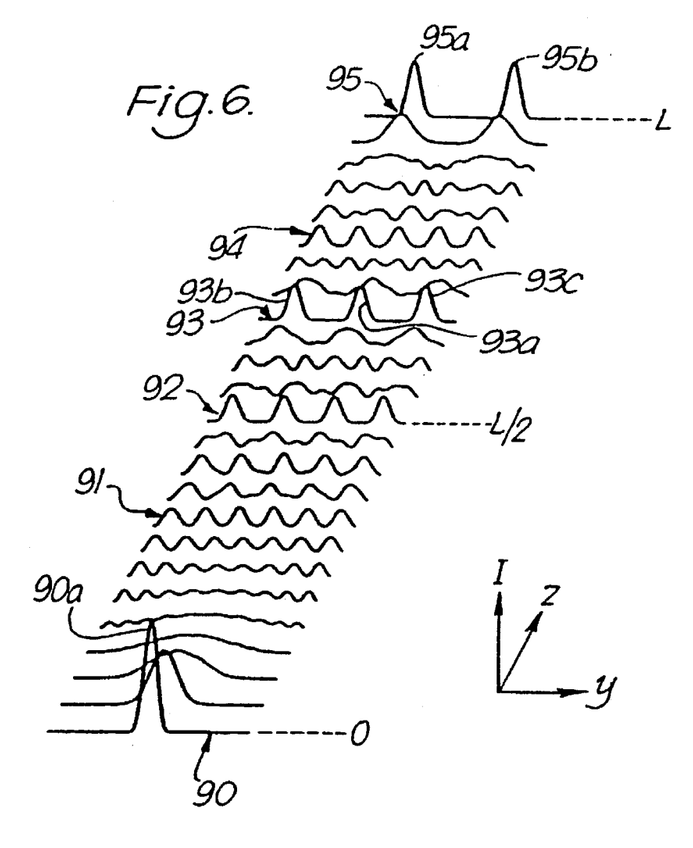

The field intensity distribution in xy planes distant z from the input region is $|E_z|^2$, the square of the modulus or magnitude in Equation (7). $|E_z|^2$ has been computed as a function of distance z along the rectangular waveguide for two values of b/a. In both cases, the waveguide width (2b) was 3 mm, and its height (2a) was 1 mm in one case and 0.5 mm in the other. This corresponds to b/a= 3 and b/a= 6, and the computation results are given graphically in FIGS. 5 and 6 respectively. FIGS. 5 and 6 give the field intensity $I=|E_z|^2$ as a function of position y across the rectangular waveguide for each of a series of values of z along this waveguide. In both cases the computation was based on a radiation wavelength of 10.59 microns ($CO_2$ laser) and an active waveguide length L of 425 mm given by Equation (1).

As illustrated in FIG. 3, when b/a= 3, only the modes $EH_{11}$, $EH_{13}$, $EH_{15}$ and $EH_{17}$ are excited, and these have approximate relative powers 0.32, 0.33, 0.13 and 0.02 respectively. When b/a= 6, the modes $EH_{11}$ to $EH_{1,13}$ are excited with respective relative powers from 0.27 to 0.02.

In FIG. 5, an initial central maximum 80 indicates the electric field intensity distribution I at the input region to the rectangular waveguide. At this point (z=0), the modes $EH_{11}$ to $EH_{17}$ give rise to electric fields which are in phase with one another and interfere constructively to produce the maximum 80. Moving down the length of the rectangular waveguide, i.e. as z increases, the modes $EH_{11}$ to $EH_{17}$ move out of phase with one another. This is a consequence of Equations (2) and (3), in which the phase coefficient $\beta_{mn}$ and therefore also the propagation constant $\gamma_{mn}$ are dependent on the mode numbers m and n.

The spatial rates of change of these modal electrical field contributions therefore differ along the z axis, i.e. axially of the rectangular waveguide. This changes the form of the interference between modal field contributions, and gives rise to a variety of electric field intensity distributions extending transversely. The distributions are indicated by curves such as 81 and 82 in xy planes at respective values of z. Approximately two thirds of the distance down the rectangular waveguide, the intensity distribution is given by a curve 83 having three similar maxima. A distance L along the rectangular waveguide, the intensity distribution is shown as a curve 84 having two well separated maxima 84a and 84b. The maxima 84a and 84b are located with their centres at the points x=0, y: −b/2, z=L and x= 0, y=+b/2, z=L respectively. They are in phase with one another.

Turning now to FIG. 6, this shows transverse electric field distributions along the length of the rectangular waveguide when its cross-sectional aspect ratio b/a is 6, as previously mentioned. As indicated in FIG. 3, the effect of increasing b/a from 3 (as in FIG. 5) to 6 (as in FIG. 6) is to reduce power coupled to rectangular waveguide modes $EH_{11}$ and $EH_{13}$ and increase power coupled to modes $EH_{15}$ to $EH_{1,13}$. Since higher order modes receive more power, the degree of structure and definition in FIG. 6 is increased over that in FIG. 5. In FIG. 6, the field distribution in the plane of the input region is indicated by a curve 90 with a single maximum 90a. As before, due to the modes $EH_{11}$ to $EH_{1,13}$ having differing $\beta_{mn}$ values, the transverse intensity distributions change with distance z along the rectangular waveguide. Curves 91 to 95 indicate locations at which there is field intensity division into multiple maxima of substantially equal form and magnitude. The curves 91, 92, 93, 94 and 95 have six, four, three, five and two maxima respectively. Curve 93 in particular has three well defined maxima 93a, 93b and 93c. The curves 91 to 95 are located at distances from the waveguide input region of L/3, L/2, 2L/3, 4L/5 and L respectively, where L is the waveguide length as has been said. These lengths can be expressed as 2L/6, 2L/4, 2L/3, 4L/5 and 2L/2. Accordingly, there is an inverse relationship between number of maxima and distance.

Figure 7:
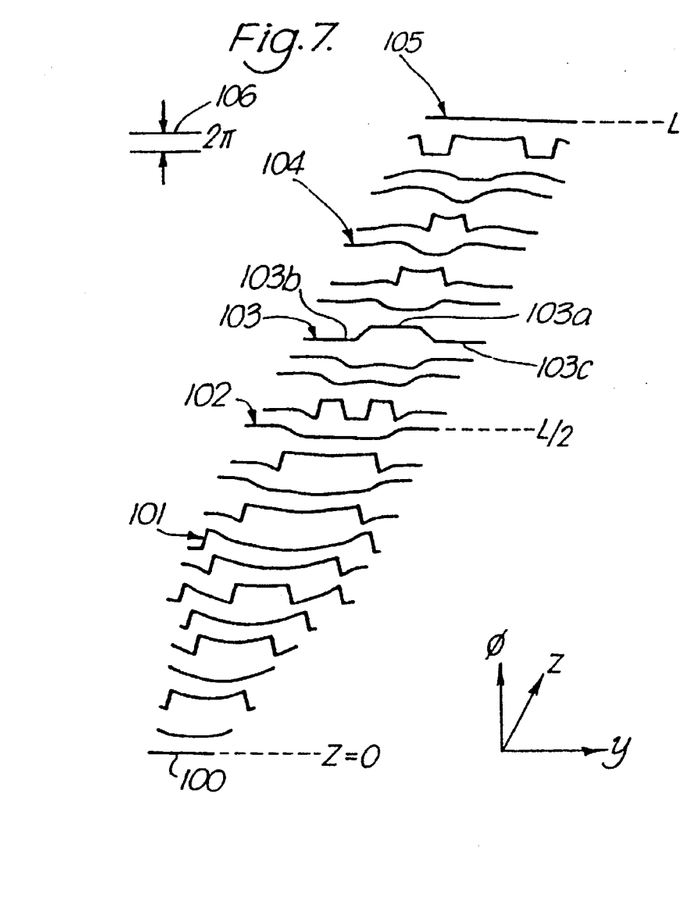
FIG. 7 provides the phase variation along each of the intensity distributions in FIGS. 5 and 6.

FIG. 7 shows the variation along the y axis of the phase φ of the resultant electric field for the waveguide dimensions from which FIG. 6 was derived. Curves such as 100 to 105 are shown, which correspond to curves 90 to 95 respectively. Each of the phase curves such as 101 indicates the phase variation of the electric field across the rectangular waveguide for a respective value of z, and corresponds to a respective intensity distribution in FIG. 6. The vertical scale of the phase representation φ is shown at 106, where an interval of 2π is indicated. The field distributions at 90 and 95 are of constant phase as indicated by straight lines 100 and 105. However, curve 103 for example has a central region 103a which differs in phase to its two outer regions 103b and 103c. The regions 103a to 103c give the phases of associated maxima 93a to 93c in FIG. 6. In consequence, the central maximum 93a is out of phase with the outer maxima 93b and 93c, which are in phase with one another. Since curves 100 and 105 are in phase, they produce reversible properties; i.e. two in-phase inputs 95a and 95b would give rise inter alia to one output 90.

FIGS. 5, 6 and 7 relate to specific values of b/a. More generally, for the situation initially considered, only $EH_{1n}$ modes are excited because of the $EH_{11}$ symmetry of the excitation from the input radiation beam. At the rectangular waveguide input region, the phase is constant. For the case involving arbitrary b/a values, using Equation (3) the phase coefficient $\beta_{1p}$ of mode $EH_{1p}$ is given by:

$$\beta_{1p} = \frac{2\pi}{\lambda} \left[ 1 - \frac{1}{2} \left\{ \left(\frac{\lambda}{4a}\right)^2 + \left(\frac{\lambda p}{4b}\right)^2 \right\} \right] \quad (8)$$

and the phase coefficient $\beta_{1q}$ of mode $EH_{1q}$ is given by:

$$\beta_{1q} = \frac{2\pi}{\lambda} \left[ 1 - \frac{1}{2} \left\{ \left(\frac{\lambda}{4a}\right)^2 + \left(\frac{\lambda q}{4b}\right)^2 \right\} \right] \quad (9)$$

By subtraction of Equation (9) from Equation (8) and rearranging, the phase difference between modes $EH_{1p}$ and $EH_{1q}$ at guide length z is $X_z$ given by:

$$\chi_z = \beta_{1p} - \beta_{1q} = \frac{\pi \times \lambda \times z}{16 \times b^2} \times (p^2 - q^2) \quad (10)$$

If the condition is imposed that a 2π phase difference exist between the modes, Equation (10) becomes:

$$\chi_z = \frac{\pi \times \lambda \times z}{16 \times b^2} \times (p^2 - q^2) = 2\pi \quad (11)$$

and the propagation distance z (say $z_{2\pi}$) in Equation (11) in rectangular waveguide that gives rise to a 2π phase difference between modes $EH_{1p}$ and $EH_{1q}$ is given by:

$$z_{2\pi} = \frac{32 \times b^2}{(p^2 - q^2) \times \lambda} \quad (12)$$

For the case of the $EH_{11}$ and $EH_{1n}$ modes (i.e. the fundamental and $n^{th}$ highest order odd mode) $z_{2\pi}$ is given by $$z_{2\pi} = \frac{32 \times b^2}{(n^2 - 1) \times \lambda} \quad (13)$$

Combining Equations (2) and (13):

$$z_{2\pi} = \frac{16L}{(n^2 - 1)} \quad (14)$$

With n=3,5,7,9,11 ... 16L/n²−1) $z_{2\pi}$ is 2L, 2L/3, L/3, L/5, 2L/15 ...

As fractions of a propagation distance 2L in rectangular waveguide which results in the $EH_{11}$ and $EH_{13}$ modes being back in phase, the relative length ratios are 1, ⅓, ⅙, ⅒, 1/15 etc. This shows that there is a harmonic relationship between the $EH_{1n}$ modes of the rectangular guide. Equation (4) shows that the propagation distance $z_{2\pi}$ which gives rise to a 2π phase shift between the fundamental $EH_{11}$ mode and the next highest order $EH_{13}$ mode also gives rise to a 2π phase shift between the fundamental and all other $EH_{1n}$ modes (n odd). This results in reproduction of any symmetric input electric field after a distance $z_{2\pi}$, provided that there is only excitation of odd $EH_{1n}$ modes. A symmetric input field is also produced periodically at distances of $tz_{2\pi}$, where "t" is an integer number if there is sufficient length of rectangular waveguide available.

Equations (11) to (14) may be rewritten to determine $z_\pi$, the propagation distance in rectangular waveguide over which an intermode phase change of π is introduced. By inspection of these equations, it is seen that:

$$z_\pi = \frac{1}{2} z_{2\pi} = 8L/(n^2 - 1) \quad (15)$$

L and 2L are the waveguide lengths over which $z_\pi$ and $z_{2\pi}$ are introduced, and L=2b²/γ from Equation (1). In consequence, $z_\pi$ and $z_{2\pi}$ are both proportional to b², and may be arranged to occur at prearranged distances along a rectangular waveguide by suitable choice of the waveguide width.

Returning to the mixer 10, of FIGS. 1 and 2, the appropriate mode structure within the waveguide 14 is the reverse of that illustrated in FIGS. 5 and 6. That is there are two fundamental $EH_{11}$ mode inputs, a length L of rectangular waveguide, and a single centrally positioned detector or output means. However, as previously mentioned, when there are two or more input radiation beams the relative phases of the inputs are important, and must be selected appropriately for the desired output.

Figure 8:
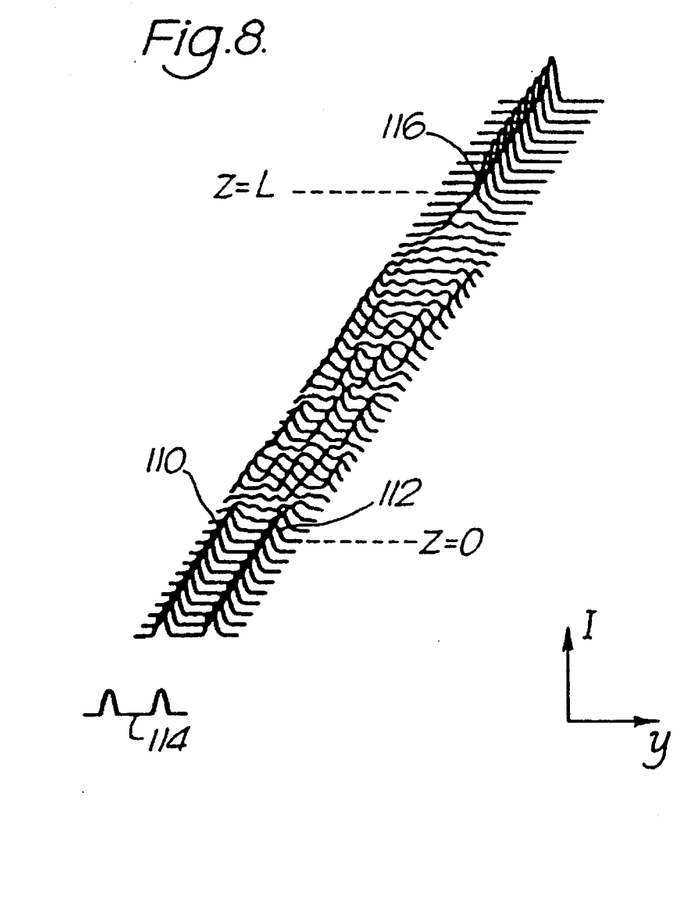
FIGS. 8 and 9 illustrate variation in electric field intensity distribution as a function of position along a multimode waveguide for two input radiation beams which are respectively in phase and in antiphase with one another.
Figure 9:
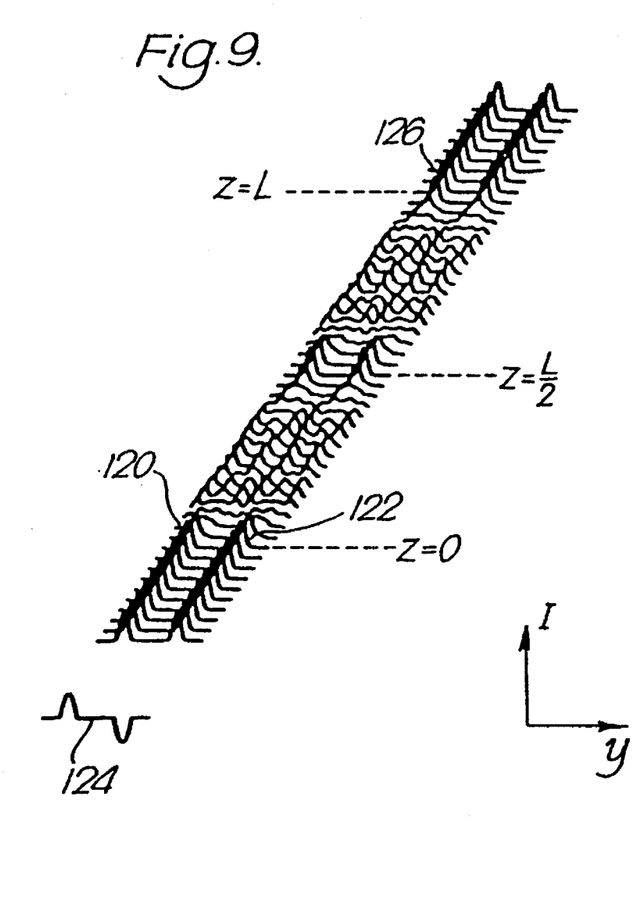

Referring now to FIGS. 8 and 9, the variation of electric field intensity distribution I with distance along a multimode waveguide is illustrated. These drawings relate to two equal intensity inputs in-phase and in anti-phase respectively. In FIG. 8, two initial maxima 110 and 112 indicate the electric field intensity distribution I at z=L. They are positioned on the y-axis at −b/2 and +b/2 respectively.

The relative phases of the maxima 110 and 112 are indicated at 114. As for beam splitting, modal dispersion occurs in the waveguide and after a length L (i.e. at z=L) a single maxima 116 is produced, positioned on the y-axis at y= 0. In FIG. 9, two initial maxima 120 and 122 indicate the electric field intensity distribution I at z= 0. They are positioned at y=−b/2 and y=+b/2 respectively. The relative phases of the maxima 120 and 122 are indicated at 124. Again modal dispersion occurs in the waveguide, but after a length L (i.e. at z=L) two maxima 126 and 128 are produced. They are positioned on the y-axis at −b/2 and +b/2 respectively. Thus the input electric field intensity distribution has been reproduced after a length L of waveguide. For phase conditions intermediate the two extremes illustrated in FIGS. 8 and 9, three output maxima will be produced at z= L. The respective amplitudes will be dependent on the relative phases of the inputs.

Figure 10:
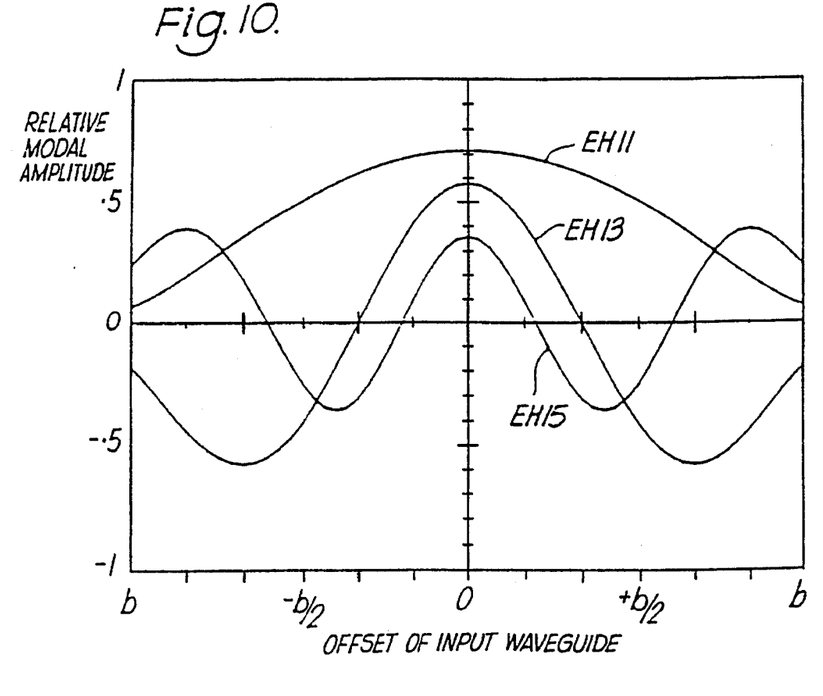
FIGS. 10 and 11 graphically illustrate relative modal amplitudes of odd and even numbered waveguide modes excited in a rectangular waveguide by a fundamental mode input beam.
Figure 11:
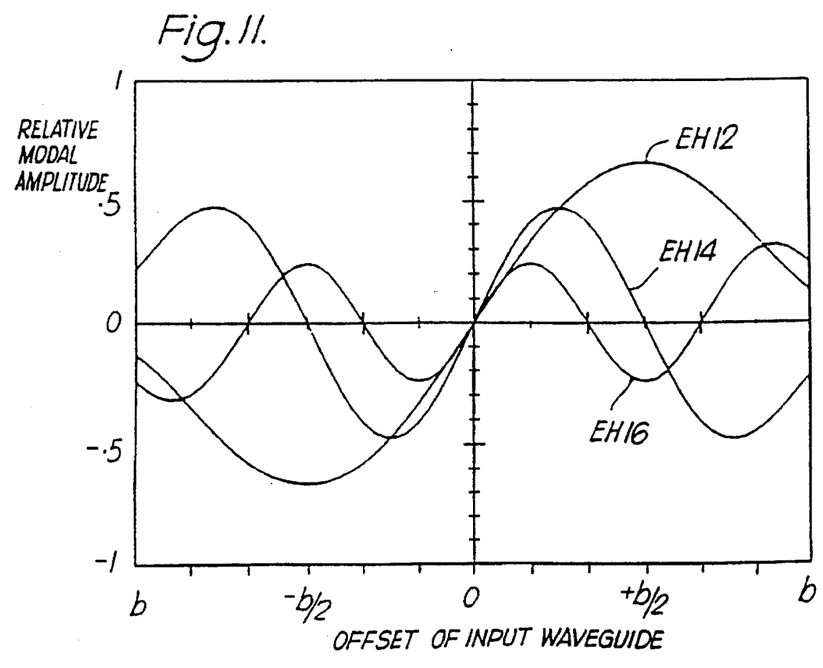

The output effects produced by the relative phases of a plurality of inputs to the rectangular waveguide are a result of the modes excited. This is discussed below with reference to FIGS. 10 and 11 which graphically illustrate relative modal amplitudes for the three lowest odd and even $EH_{mn}$ modes respectively, as an input waveguide bearing a fundamental mode beam is offset from the centre of the rectangular waveguide input region. In the device 10 the two inputs are located within the input region 22 at y=± b/2. As can be seen from FIG. 10 the odd modes, $EH_{11}$, $EH_{13}$ and $EH_{15}$ are excited with identical amplitudes by inputs in these two positions. However, as can be seen from FIG. 11 the even modes, $EH_{12}$, $EH_{14}$ and $EH_{16}$ are excited with amplitudes of identical magnitude but opposite sign by two such inputs. Therefore when the two inputs are in phase with each other the excitations of the odd modes sum to produce twice the amplitude of a single input at −b/2 or +b/2 whilst the even modes cancel each other out. As was shown earlier, excitation of only odd modes (n= 1,3,5 etc) leads to the two inputs summing to form a single maximum at the out region 24. When the two inputs are in antiphase with each other the odd modes cancel out and the even modes sum to produce twice the amplitude of a single input at −b/2 or +b/2. Again, as was shown earlier, this input condition produces two maxima at the output region 24.

The mixer 10 may be designed for operation with radiation from a $CO_2$ laser of wavelength 10.59 μm. Its dimensions may be 2a=0.6 mm, 2b=1.2 mm and $L=2b^2/\lambda=106$ mm. The setting of b=2a indicates the minimum width and hence length for which the mixer 10 may be constructed. However, with b=2a the three output maxima produced for most input phase conditions are not fully resolved. The inner tails of the laterally positioned maxima overlap with the tails of the central maximum. Thus a detector 34 of width 2a will never receive zero intensity, but the intensity will vary with the beat frequency. The detector 34 may be narrower than 2a if required. Alternatively the dimensions of the mixer 10 may be 2a= 0.6 mm, 2b=1.8 mm and $L=2b^2/\lambda=153$ mm. In this case b=3a and the three output maxima will overlap less and therefore be better resolved. However to achieve full resolution of the three maxima a rectangular waveguide with b=4a is necessary, and this requires $L=2b^2/\lambda=272$ mm if 2a=0.6 mm.

The waveguides 14, 26, 28 of the device 10 may be constructed, for use at 10.59 μm of materials other than alumina, e.g. BeO, Si, Macor or metal. Furthermore, the square waveguides 26 and 28 may be replaced by other forms of waveguide. For instance, a device of the invention may incorporate square section waveguides of side 2a with sides at 45° to the x and y axes, or elliptical guides with the major and minor axes parallel to the x and y axes. However the square of the waveguide depth should be an integral multiple of the product of multimode waveguide length and wavelength in that waveguide. Other shapes such as diamond or octagonal guides may also be used. In addition optical fibres may be used.

The mixer 10 may have various additional features. It may be advantageous for the remaining area of the output region 24, not occupied by the detector 34, to be made from an absorbent material, or bear an antireflective coating. This would prevent radiation reflecting back into the rectangular waveguide 14 and interfering with the desired mode structure.

Figure 12:
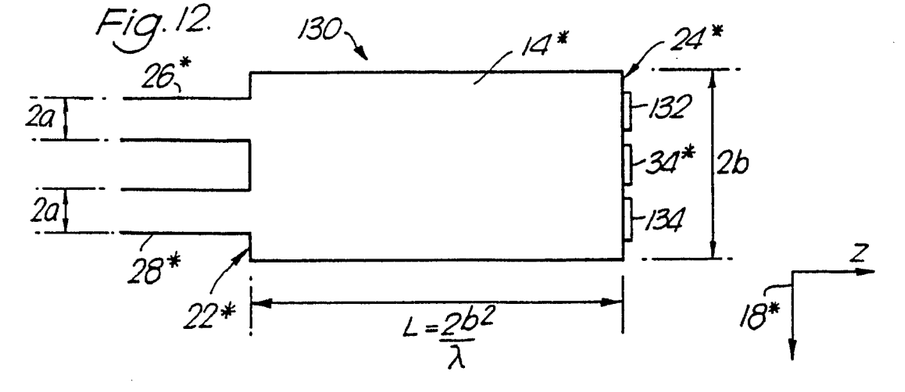
FIGS. 12 and 13 schematically illustrate devices of the invention for use in heterodyne detection.

Referring now to FIG. 12 an alternative embodiment of the invention is illustrated schematically. It consists of a mixer 130. The mixer 130 0 operates in a very similar manner to the mixer 10 and therefore the following description concentrates on areas of difference. Parts common to the mixer 10 of FIG. 1 are like referenced with the addition of an asterisk superscript (*). The essential difference between mixers 10 and 130 is the presence of two additional detectors 132 and 134, and associated circuitry (not shown). The two additional detectors 132, 134 are linked together such that their output signals are combined.

The additional detectors 132, 134 are located in the z=L plane with their centres at x= 0, y= ±b/2. Thus in operation as a heterodyne mixer a central output maximum when produced would be incident on the detector 34* whilst lateral output maxima would be incident on the additional detectors 132, 134. As the intensity incident on the central detector 34* falls, that incident on the lateral detectors 132, 134 rises. The mixer 130 does not obtain any additional information over that obtained by the mixer 10 but, depending on operating conditions, may provide an improved signal to noise ratio.

As discussed above the resolution of the three output maxima depends on the width of the rectangular waveguide 14*. If it is desired that the maxima are fully resolved and the detectors 34*, 132, 134 are 2a wide then b must be set at 4a and the length will be $32a^2/\lambda$. However if the length of the mixer 130 is required to be shorter the detectors 34*, 132, 134 may be narrower. For instance if b=5a, and the detectors 34*, 132 and 134 are 1.2a wide then the mixer 130 will be $L= 12.5a^2/\lambda$ long and have reasonable performance.

Figure 13:
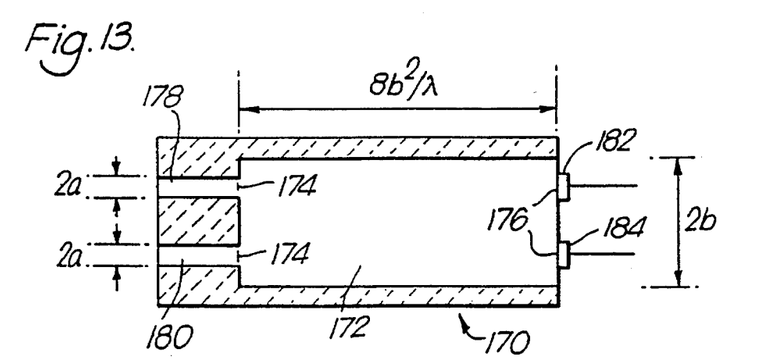

Referring now to FIG. 13, a further two input mixer of the invention is illustrated schematically. The mixer is indicated generally by 170. It incorporates a rectangular waveguide 172 of width 2b, height 2a and length $L=8b^2/\lambda$. The width 2b must in general be equal to or greater than 4a, and in this case 2b=4a. The waveguide 172 has input and output regions 174, 176 respectively at its mutually opposite longitudinal ends. As for previously described embodiments Cartesian co-ordinates will be employed to describe positions within the device 170, the axes and origin are similarly defined. Two input square waveguides 178, 180 are connected to the input region 174 such that input radiation beams provided by them are centred at x= 0, y=−b/2 and x=0, y=+b/2 respectively. Two detectors 182, 184 are located in the output region 176 centred at x=0, y=−b/2 and x=0, y=+b/2.

The two input square waveguides 178, 180 each provide a fundamental mode input. As described earlier, these may be a local oscillator signal and a Doppler shifted received signal respectively. When the two inputs are either in phase or in antiphase with one another, two substantially equal intensity maxima are produced in the output region 176, centred on x=0, y=±b/2. When the received signal in waveguide 180 is 90° ahead of the local oscillator signal in waveguide 178 then a single maximum is produced in the output region centred on x=0, y=+b/2. When the received signal is 270° ahead of the local oscillator signal then a single maximum centred on x= 0, y= −b/2 is produced. Thus, the intensity incident on each of the detectors 182, 184 varies at the beat or difference frequency.

Referring to Table 1 the relative dimensions of the various embodiments described, of two input mixers of the invention, are summarised. It can be seen from Table 1 that a compromise has to be reached between the length of the device and the resolution of the output maxima. In many applications the length will be the more important criterion. There may however be manufacturing processes which make relatively straightforward the production of devices each having a rectangular waveguide the same width as the sum of the widths of associated input waveguides.

TABLE 1

Relative Dimensions for Various Embodiments of Two Input Mixers of the Invention

| Rectangular Waveguide | | | |
|---|---|---|---|
| Width (2b) | Length | Inputs | Outputs |
| 4a | $8a^2/\lambda$ $(2b^2/\lambda)$ | $y = \pm b/2$ | $y = 0, \pm b/2$ partially resolved |
| 6a | $18a^2/\lambda$ $(2b^2/\lambda)$ | $y = \pm b/2$ | $y = 0, \pm b/2$ partially resolved |
| 8a | $32a^2/\lambda$ $(2b^2/\lambda)$ | $y = \pm b/2$ | $y = 0, \pm b/2$ fully resolved |
| 4a | $32a^2/\lambda$ $(8b^2/\lambda)$ | $y = \pm b/2$ | $y = 0, \pm b/2$ fully resolved |

A further alternative to the embodiments described above will now be described. It incorporates a multimode waveguide of width 2b greater than 4a, but with two input waveguides positioned at y=±(b−a). That is the input waveguides are positioned adjacent to the sides of the input region of the multimode waveguide, with a gap therebetween. This device structure will lead to some distortion of the electric field structure described earlier, in particular of the central output maximum. However it will provide for zero intensity at the centre of the output region when the two inputs are in phase. The distortion may thus be acceptable if the result is improved discrimination at the detectors. Suitable relative dimensions may be 2b=4.5a and L=10.125$a^2/\lambda$.

Embodiments of the invention may be constructed with alternatives to detectors located in the rectangular waveguide output region. For instance output waveguides may be positioned to accept the maxima in place of the detectors, with detectors located within the output waveguides remote from the output region.

The invention is not limited to mixers for use in heterodyne detection. There are many applications where it is desired to combine radiation beams prior to detection for which embodiments of the invention maybe used. In addition the invention is not limited to mixing devices with two inputs.

The invention is also not limited to use of hollow core optical waveguides for use of wavelengths of 10.59 μm. Provided the devices are constructed from appropriate materials for the wavelength of operation, they may be constructed for use over a wide range of wavelengths. For instance they may be constructed, using semi-conductor layer technology, from GaAs and AlGaAs for use with radiation from Nd-YAG lasers (free space wavelength λ=1.064 μm).

Figure 14:
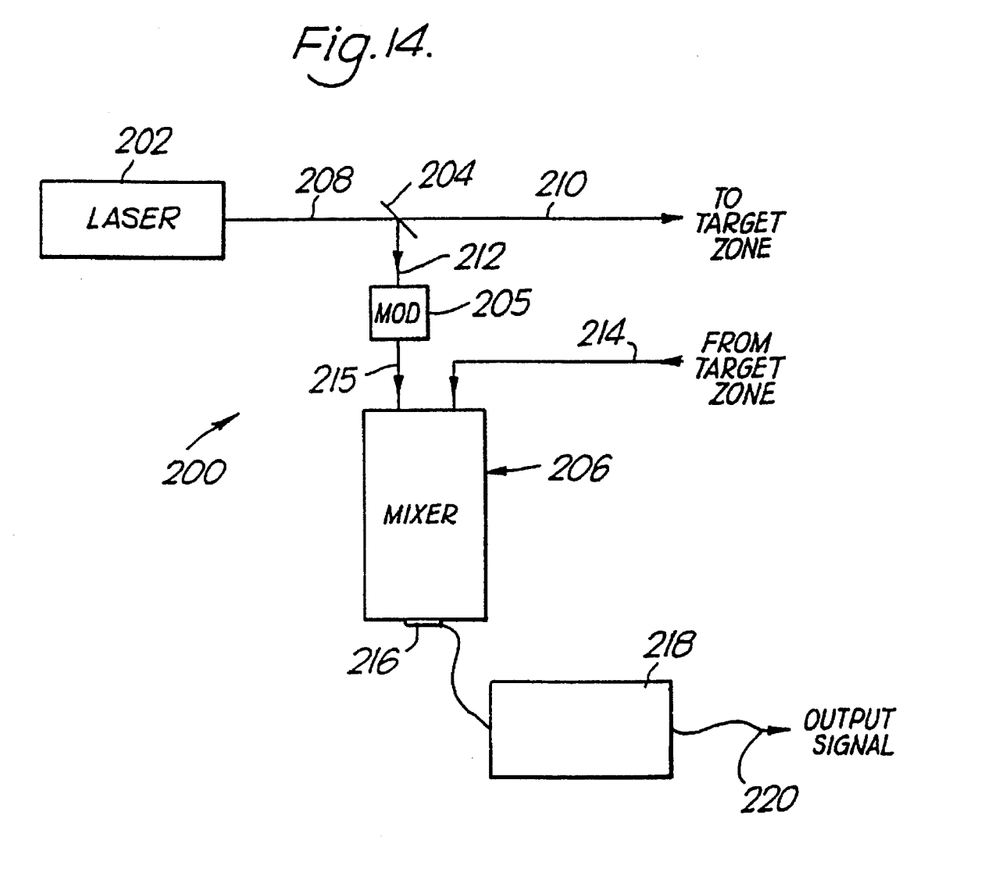
FIG. 14 schematically illustrates a laser radar system incorporating a mixing device of the invention.

Referring now to FIG. 14, a laser radar system incorporating a device of the invention, in the form of a heterodyne mixer, is illustrated schematically. The system is indicated generally by 200. It incorporates a laser radiation source 202, a beamsplitter 204, an acousto-optic modulator 205 and a mixing device of the invention 206 similar to the device 10 of FIG. 1. It also incorporates optical waveguides 208, 210, 212, 214 and 215 directing radiation between optical components and to and from a target zone (not shown). The mixing device 206 incorporates a detector 216 and associated circuitry 218.

The system 200 operates as follows. Radiation emitted by the laser 202 passes down the waveguide 208 to the beamsplitter 204. It is split into first and second beams. The first beam passes down the waveguide 210 and becomes an output beam to the target zone. The second beam passes along the waveguide 212 to the acousto-optic modulator 205 where it undergoes a small frequency shift. The frequency shifted beam passes to the mixing device 206 and is employed as a local oscillator signal. Radiation reflected or scattered from the scene is received by the waveguide 214, and passes to the mixing device 206. It forms a received signal including Doppler shifted components reflected from moving objects or particles. The Doppler shift may be an increase or decrease in frequency.

The mixing device 206 operates as previously described for the device 10. Radiation passing to the mixing device 206 along waveguides 212 and 214 is mixed and the intensity incident on the detector 216 varies with difference frequency of the local oscillator signal and the received signal. An output electrical signal is provided, by the associated circuitry 218, at 220. The purpose of the acousto-optic modulator 205 to avoid the loss of decreased frequency components after subtraction of the local oscillator frequency, and which would otherwise correspond to negative frequencies; is a source frequency to which becomes downshifted by a Doppler frequency shift $f_D$ becomes a frequency $f_o-f_D$. Subtraction of the local oscillator frequency (also $f_o$) apparently produces −$f_D$, which does not exist. To avoid this, subtracting a modulation frequency $f_A$ from the source frequency produces a local oscillator frequency $f_o-f_A$. A negative Doppler shift then gives a frequency $f_A-f_D$, which can be arranged to remain positive.

Figure 15:
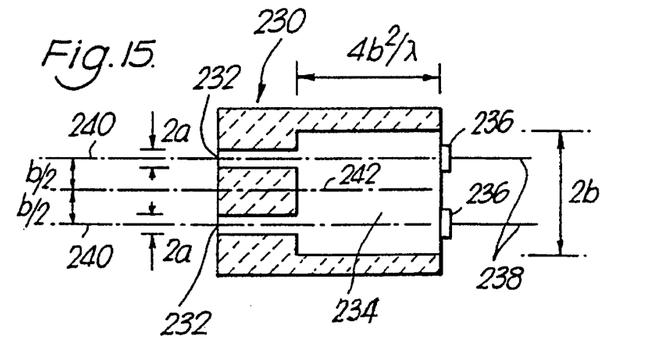
FIG. 15 schematically illustrates a further mixing device of the invention.

Referring now to FIG. 15, there is shown a further embodiment of a mixing device of the invention indicated generally by 230. It incorporates two square section fundamental mode input waveguides 232 of side 2a, these being connected to a rectangular multimode waveguide 234 of cross-section 2a by 2b and length $4b^2/\lambda$. As before, λ is the wavelength of radiation in the rectangular waveguide 234 for which the device 230 is designed. The rectangular waveguide 234 has two detectors 236 with associated output lines 238.

The input waveguides 232 have central axes 240 offset by b/2 on respective sides of a rectangular waveguide central longitudinal axis 242. The detectors 238 are centred on respective input waveguide axes 240.

The device 230 operates as follows. Radiation beams (not shown) are input to the input waveguides 232 and propagate therein in fundamental mode. On reaching the rectangular waveguide 234 they undergo modal dispersion. If the two contributions of radiation reaching the rectangular waveguide are in phase with one another, the detectors 236 receive respective radiation intensity maxima of like magnitude centred on axes 240. If however one input contribution leads the other in phase by 90°, then that detector 236 which is aligned with the input waveguide 232 providing that contribution receives 85% of the radiation intensity reaching the right hand end of the rectangular waveguide 234 and the other detector receives 15%. Variation in the input phase as a function of time produces a variation in each detector signal between 15% and 85% of the sum of the signals. Unlike the device 170 of FIG. 13, the theoretical modulation depth is only 70% instead of 100%, but against this the device 230 is more compact because it has a rectangular waveguide 234 half the length of the equivalent 172 for the device 170.

We claim:

1. An optical mixing device including:
   (a) a multimode mixer waveguide having an input region and an output region, and
   (b) two input waveguides, operational in a fundamental mode and coupled to the input region, said two waveguides comprising a means for providing two fundamental mode radiation beams input to the mixer waveguide, and
   (c) detecting means for receiving a mixed radiation output transmitted by the mixer waveguide to the output region,
   wherein the dimensions of the mixer waveguide, and the positions and spatial characteristics of the input radiation beams in combination comprise a means for modally dispersing both input radiation beams within the mixer waveguide and for mixing both input radiation beams to provide a mixed radiation output, said detecting means comprising a means for detecting said mixed radiation output and for providing an output variable in response to relative phase changes of said input radiation beams.

2. An optical mixing device according to claim 1 wherein the detecting means is located centrally of the mixer waveguide transverse cross-section.

3. An optical mixing device according to claim 1 wherein the mixer waveguide is of rectangular cross-section.

4. An optical mixing device including:
   (a) a multimode mixer waveguide having an input region and an output region, and
   (b) two input waveguides arranged for fundamental mode operation are coupled to the input region and are arranged to provide two radiation beams input to the mixer waveguide, and
   (c) detecting means are arranged to receive radiation transmitted by the mixer waveguide to the output region,
   and wherein the dimensions of the mixer waveguide, and the positions and spatial characteristics of the input radiation beams are in combination arranged to provide for modal dispersion in the mixer waveguide giving rise to input radiation mixing in the output region and mixed radiation detection by the detecting means,
   wherein the mixer waveguide is of rectangular cross-section, and
   wherein a first detecting means is located centrally within the output region and second and third detecting means are located centrally of respective halves of the mixer waveguide transverse cross-section at the output region.

5. An optical mixing device according to claim 4 wherein the mixer waveguide has a greater cross-sectional side of length $2b$, the input waveguides comprise a means for providing input radiation with a wavelength $\lambda$ measured within the mixer waveguide and the mixer waveguide is of length L of $2b^2/\lambda$.

6. An optical mixing device including:
   (a) a multimode mixer waveguide having an input region and an output region, and
   (b) two input waveguides arranged for fundamental mode operation are coupled to the input region and are arranged to provide two radiation beams input to the mixer waveguide, and
   (c) detecting means are arranged to receive radiation transmitted by the mixer waveguide to the output region,
   and wherein the dimensions of the mixer waveguide, and the positions and spatial characteristics of the input radiation beams are in combination arranged to provide for modal dispersion in the mixer waveguide giving rise to input radiation mixing in the output region and mixed radiation detection by the detecting means,
   wherein the mixer waveguide is of rectangular cross-section, and
   wherein said detecting means includes first and second detecting means, said first and second detecting means comprising a means for detecting spatial variations in intensity of the mixed radiation within the output region.

7. An optical mixing device according to claim 6 wherein the first and second detecting means are located centrally of respective halves of the mixer waveguide transverse cross-sectional at the output region.

8. An optical mixing device according to claim 7 wherein the mixer waveguide has a greater cross-sectional side of length $2b$, the input waveguides comprise a means for providing input radiation with a wavelength $\lambda$ measured within the mixer waveguide and the mixer waveguide is of length L of $8b^2/\lambda$ or $4b^2\lambda$.

9. An optical mixing device including:
   (a) a multimode mixer waveguide having an input region and an output region, and
   (b) two input waveguides arranged for fundamental mode operation are coupled to the input region and are arranged to provide two radiation beams input to the mixer waveguide, and
   (c) detecting means are arranged to receive radiation transmitted by the mixer waveguide to the output region,
   and wherein the dimensions of the mixer waveguide, and the positions and spatial characteristics of the input radiation beams are in combination arranged to provide for modal dispersion in the mixer waveguide giving rise to input radiation mixing in the output region and mixed radiation detection by the detecting means,
   wherein the mixer waveguide is formed as a hollow within solid dielectric material.

10. An optical mixing device according to claim 9 wherein the material is alumina.

11. An optical mixing device including:
    (a) a multimode mixer waveguide having an input region and an output region, and (b) two input waveguides, operational in a fundamental mode and coupled to the input region, said two input waveguides comprising a means for providing two fundamental mode radiation beams input to the mixer waveguide, and (c) detecting means for receiving radiation transmitted by the mixer waveguide to the output region, wherein the dimensions of the mixer waveguide, and the positions and spatial characteristics of the input radiation beams in combination comprise a means for providing modal dispersion in the mixer waveguide giving rise to input radiation mixing in the output region and mixed radiation detection by the detecting means, wherein the mixer waveguide is formed as a ridge waveguide upstanding from a substrate.

12. An optical mixing device according to claim 11 wherein it is formed of layers of materials of one of a ternary and quaternary semiconductor material system.

13. An optical mixing device according to claim 12 wherein the material system is $Al_xGa_{1-x}As$.

14. An optical mixing device including:

(a) a multimode mixer waveguide having an input region and an output region, and (b) two input waveguides arranged for fundamentals mode operation are coupled to the input region and are arranged to provide two radiation beams input to the mixer waveguide, and (c) detecting means are arranged to receive radiation transmitted by the mixer waveguide to the output region.

and wherein the dimensions of the mixer waveguide, and the positions and spatial characteristics of the input radiation beams are in combination arranged to provide for modal dispersion in the mixer waveguide giving rise to input radiation mixing in the output region and mixed radiation detection by the detecting means, wherein the input waveguides are of square cross-section.

15. An optical mixing device including:

(a) a multimode mixer waveguide having an input region and an output region, and (b) two input waveguides arranged for fundamental mode operation are coupled to the input region and are arranged to provide two radiation beams input to the mixer waveguide, and (c) detecting means are arranged to receive radiation transmitted by the mixer waveguide to the output region, and wherein the dimensions of the mixer waveguide, and the positions and spatial characteristics of the input radiation beams are in combination arranged to provide for modal dispersion in the mixer waveguide giving rise to input radiation mixing in the output region and mixed radiation detection by the detecting means, wherein one of the input waveguides is coupled to a coherent radiation source and the two input radiation beams are a local oscillator signal derived from the said source and a return signal received from a target zone by virtue of one of reflection and scattering of an output beam from the said source, the device comprising a heterodyne mixer.

* * * * *